United States Patent
Bartsch

(10) Patent No.: US 7,685,578 B2
(45) Date of Patent: Mar. 23, 2010

(54) METHOD AND PROTOCOL TESTER FOR DECODING DATA ENCODED IN ACCORDANCE WITH A PROTOCOL DESCRIPTION

(75) Inventor: Wolfgang Bartsch, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1537 days.

(21) Appl. No.: 10/391,986

(22) Filed: Mar. 18, 2003

(65) Prior Publication Data

US 2003/0191599 A1  Oct. 9, 2003

(30) Foreign Application Priority Data

Mar. 22, 2002  (EP) ................... 02006711

(51) Int. Cl.
*G06F 9/45* (2006.01)
(52) U.S. Cl. ...................................... 717/139; 717/136
(58) Field of Classification Search .................. 714/746
See application file for complete search history.

(56) References Cited

U.S. PATENT DOCUMENTS 5,828,677 A * 10/1998 Sayeed et al. ................ 714/774
6,000,041 A    12/1999 Baker et al.
2001/0032069 A1  10/2001 Arweiler
2001/0053153 A1  12/2001 Bartsch

FOREIGN PATENT DOCUMENTS

EP       0 332 286       9/1989

* cited by examiner

*Primary Examiner*—Kevin L Ellis
*Assistant Examiner*—Steve Nguyen
(74) *Attorney, Agent, or Firm*—Francis I. Gray

(57) ABSTRACT

A method and protocol tester for decoding data for the performance of a measurement task, which data is encoded in accordance with a protocol description, includes modifying the protocol description with respect to the measurement task by compressing protocol elements that are of no relevance to the measurement task and decoding the encoded data according to the modified protocol description to provide only decoded data relevant to the measurement task. The decoded data may be filtered before further processing according to a filter condition determined by the measurement task. Alternatively the filter condition may be installed as part of the modified protocol description. Then additional filtering may be applied when there are further filter conditions determined by the measurement task. The result is a protocol tester that permanently stores the protocol description while allowing modification of the protocol description for each measurement task, reducing storage and calculation requirements.

8 Claims, 4 Drawing Sheets

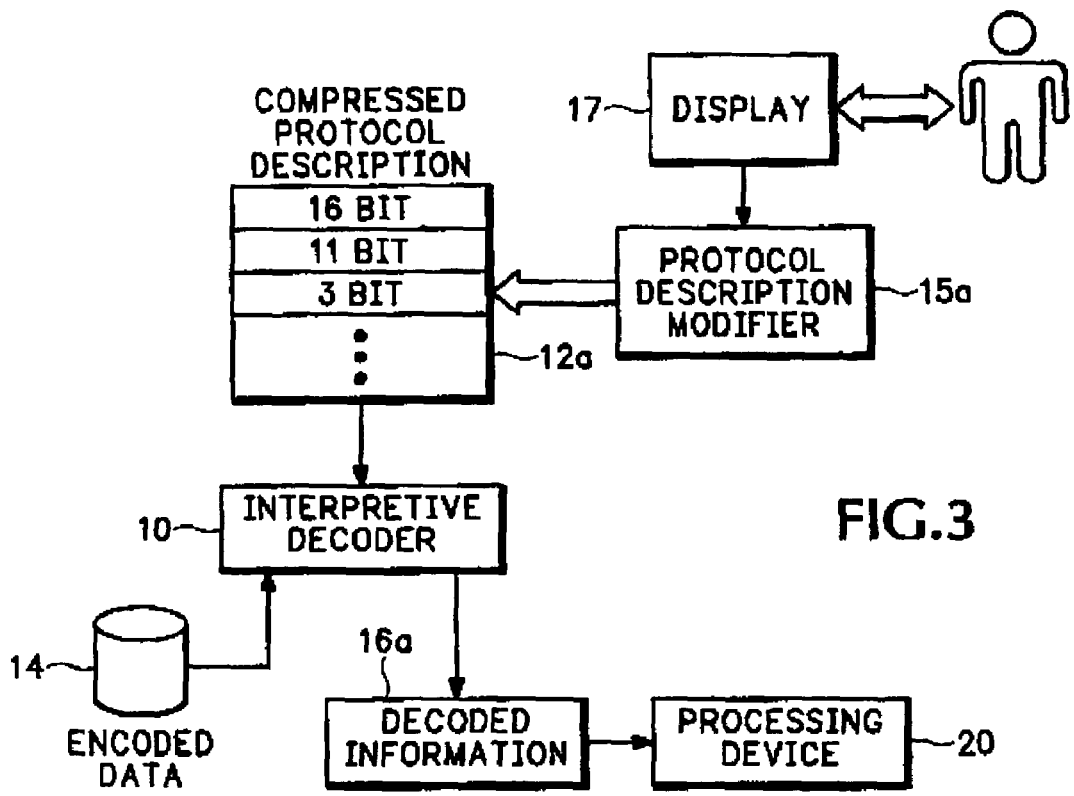

FIG.3

MEASUREMENT: VALUE OF CID_LAC

FIG.4

STEP 1) decode CID_DISC
STEP 2) check CID_MCC depends_on CID_DISC
STEP 3) decode CID_MCC
STEP 4) decode CID_MCC_FILLER
STEP 5) check CID_MNC_D1 depends_on CID_DISC
STEP 6) decode CID_MNC_D1
STEP 7) check CID_MNC_D2 depends_on CID_DISC
STEP 8) decode CID_MNC_D2
STEP 9) check CID_LAC depends_on CID_DISC
STEP 10) decode CID_LAC
STEP 11) check CID_CI depends_on CID_DISC
STEP 12) decode CID_CI
STEP 13) check CID_LAC1 depends_on CID_DISC
STEP 14) check CID_CI1 depends_on CID_DISC
STEP 15) check CID_CI2 depends_on CID_DISC FIG.5a (PRIOR ART)

```
—— 0000      CID_DISC           CGI used to identify cell
b12*      CID_MCC            '222'
1111 ——      CID_MCC_FILLER     15
—— 0000      CID_MNC_D1         0
0010 ——      CID_MNC_D2         2
*B2*      CID_LAC            25000
*B2*      CID_CI             50000
```

```
STEP 1) decode CID_DISC
STEP 2) switch_on CID_DISC
STEP 3) skip CID_MCC, CID_MCC_FILLER, CID_MNC_D1, CID_MNC_D2
STEP 4) decode CID_LAC
```

```
*B2*      CID_LAC            25000
```

FILTER-CONDITON: Pass data, if CID_MCC ! = 222

FIG.8

STEP 1) decode CID_DISC
STEP 2) check CID_MCC depends_on CID_DISC
STEP 3) decode CID_MCC
STEP 4) decode CID_MCC_FILLER
STEP 5) check CID_MNC_D1 depends_on CID_DISC
STEP 6) decode CID_MNC_D1
STEP 7) check CID_MNC_D2 depends_on CID_DISC
STEP 8) decode CID_MNC_D2
STEP 9) check CID_LAC depends_on CID_DISC
STEP 10) decode CID_LAC
STEP 11) check CID_CI depends_on CID_DISC
STEP 12) decode CID_CI
STEP 13) check CID_LAC1 depends_on CID_DISC
STEP 14) check CID_CI1 depends_on CID_DISC
STEP 15) check CID_CI2 depends_on CID_DISC

FIG.9a (PRIOR ART)

| | | |
|---|---|---|
| ---- 0000 | CID_DISC | CGI used to identify cell |
| b12** | CID_MCC | '222' |
| 1111 ---- | CID_MCC_FILLER | 15 |
| ---- 0000 | CID_MNC_D1 | 0 |
| 0010 ---- | CID_MNC_D2 | 2 |
| *B2* | CID_LAC | 25000 |
| *B2* | CID_CI | 50000 |

FIG.9b (PRIOR ART)

FILTER
STEP 16) check CID_MCC ! = 222

FIG.9c (PRIOR ART)

STEP 1) decode CID_DISC
STEP 2) check CID_MCC depends_on CID_DISC
STEP 3) decode CID_MCC
STEP 4) check CID_MCC ! = 222

FIG.10a

| | | |
|---|---|---|
| ---- 0000 | CID_DISC | CGI used to identify cell |
| b12** | CID_MCC | '222' |

FIG.10b

METHOD AND PROTOCOL TESTER FOR DECODING DATA ENCODED IN ACCORDANCE WITH A PROTOCOL DESCRIPTION

BACKGROUND OF THE INVENTION

The present invention relates to protocol testing, and more particularly to a method and a protocol tester for decoding data encoded in accordance with a protocol description for the performance of a measurement task.

Particularly in protocol measurement technology, the encoding, decoding and analysis of digital data occupies a central role, with so-called protocol data units being examined by computer software and the information contained therein being extracted. In this context, FIG. 1 shows a procedure known from prior art, in which an interpretative decoder 10 reads a general protocol description 12 and, based on the protocol description, decodes encoded data 14 also read in, and makes the data available as decoded information 16 to a processing device 20. The general protocol description is firm, suited for a plurality of measurement tasks and describes the encoded data, as a maximum, exactly down to each bit. The general protocol description preferably includes information on the meaning of the bits, the names of bit groups, the format of the presentation, for example a string, hexadecimal or binary, and on the formation of summaries in the form of parameters or messages. In contrast to firm decoding routines, which exist unchangeably for certain protocols, interpretative decoding routines, i.e. decoders with an interpreter, have the advantage that the very same hardware can be adapted easily to different protocols by loading the corresponding general protocol description of the associated protocol. Tree-structured protocol descriptions, however, lead to a high storage demand for a reduced calculation expense, while linear protocol descriptions lead to an increased calculation expense for a reduced storage demand.

There is also the possibility to manually program protocol descriptions for certain repetitive measurement tasks, the disadvantage being that the manually programmed protocol descriptions are designed for a certain measurement task and are therefore already no longer suitable for performing a slightly modified measurement task. In particular, it proves awkward and time-consuming, depending on the measurement task to be resolved, to select and load into the decoder device a suitable protocol description programmed manually in a reduced manner. In order to be able to perform any measurement tasks, it is therefore necessary, in the prior art, to work with the general protocol description which, regardless of whether it shows a linear structure or a tree structure, leads to a high calculation expense for the decoding process.

FIG. 2 shows elements of another protocol tester known from the prior art, the same reference signs being used in the figures for the same or for comparable elements—this applies to all figures. For the protocol tester shown in FIG. 2, the decoder 10 has a downstream filter 18, the decoder 10 transmitting on the one hand decoded data to the filter, and on the other hand information for filter adjustment. In filter 18 data not required, i.e., data which fail to meet at least one filter condition, are discarded. The data which meet the at least one filter condition are made available as decoded information 16 to the processing device 20.

Note that the decoder executes the protocol description, regardless of whether a protocol element, which does not fulfil the at least one filter condition, has already been decoded and has to be taken as a indication that a whole series of subsequent decoding depending thereon are no longer necessary. This means that certain data may be excluded from further decoding because they are of no importance for the present measurement task, which in turn means that, in the prior art, the decoding process is continued and hence the calculation expense increased unnecessarily, even though it is not really required.

What is desired is a generic method and a generic protocol tester that performs a plurality of measurement tasks at a low expense of time and calculation.

BRIEF SUMMARY OF THE INVENTION

Accordingly the present invention is based on the realization that a generic method and protocol tester may be achieved by having an original general protocol description at least in part automatically modified at the time of the configuration of a measurement task. The modification reflects the interest situation, i.e. the protocol elements to be decoded with regard to the measurement task. The configuration point in time is the point in time at which all protocol description parts necessary for the measurement task, which have to be provided by the decoding device as an output signal for the solution of the measurement task, have been fixed. Only general protocol descriptions have to be filed in the protocol tester, as the protocol descriptions optimised with respect to a specific measurement task only have to be stored temporarily and can be re-created from the relevant general protocol description by an appropriate entry without much effort, resulting in a major saving of storage space. With an existing storage medium, the storage space may then be used to keep protocol descriptions of the most diverse of other protocols available in the very same protocol tester so as to increase the universality of the protocol tester. With the calculation expense optimised, one single protocol tester is usable for the most diverse of protocols and still guarantees the performance of measurement tasks in a very short time. With the general protocol description optimally modified, the calculation expense for the decoding is reduced to what is absolutely necessary. The modified protocol description is stored in the protocol tester in particular only temporarily for the performance of a certain measurement task, while the general protocol description remains unchanged and can again be used for modification for other measurement tasks and other configurations, respectively. With another variant, the calculation expense is minimised by modifying the protocol description by installing at least one of filter conditions within the protocol description.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is an embodiment of a protocol tester according to the present invention.

FIG. 4 is an example of a measurement task.

FIG. 5a is a sequence of a protocol description for the performance of the measurement task of FIG. 4 with the prior art protocol tester according to FIG. 1.

FIG. 5b shows the decoding results belonging to FIG. 5a.

FIG. 6a is a modified protocol description required for solving the measurement task of FIG. 4 according to the protocol tester of FIG. 3.

FIG. 6b shows the decoding result belonging to the protocol description of FIG. 6a.

FIG. 7 is another embodiment of a protocol tester according to the present invention.

FIG. 8 is an example of a filter condition for a protocol tester.

FIG. 9a is the protocol description for the decoding of data to be executed by the prior art protocol tester of FIG. 2.

FIG. 9b is the decoding result belonging to FIG. 9a.

FIG. 9c is the filter step succeeding the decoding process in order to perform the filter condition of FIG. 8 with the prior art protocol tester of FIG. 2.

FIG. 10a is the modified protocol description to be executed by the protocol tester of FIG. 7.

FIG. 10b is the result belonging to the modified protocol description of FIG. 10a.

DETAILED DESCRIPTION OF THE INVENTION

Figure 1:
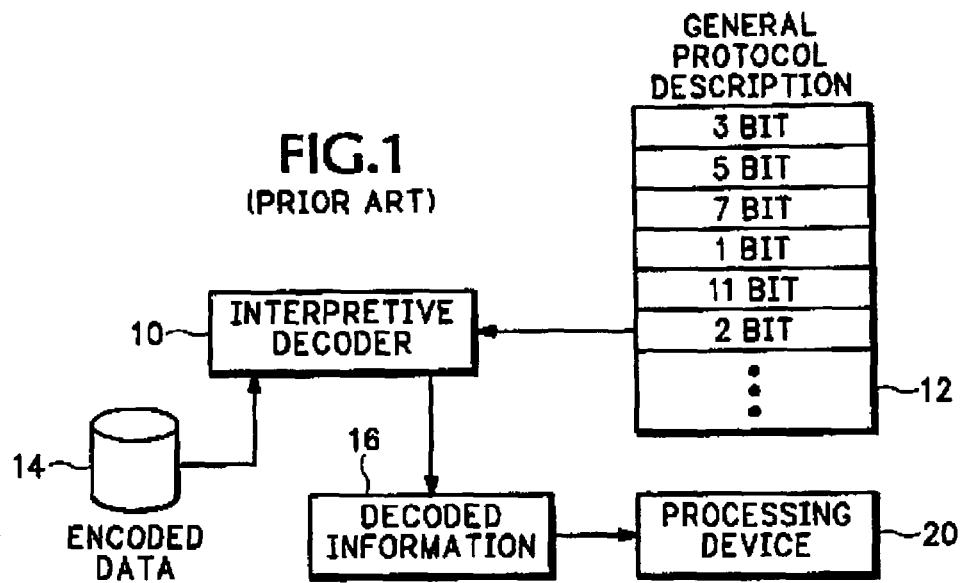
FIG. 1 is a schematic representation of elements of a protocol tester known from prior art.

Referring now to FIG. 3 a first embodiment of a protocol tester according to the present invention is shown which executes a compressed protocol description, with protocol elements of the protocol description which are of no relevance with respect to the measurement task being combined with respect to the measurement task to be performed, or, respectively, with dependencies and/or conditions being combined, or respectively, skip commands being incorporated into the protocol description, the skip commands being worded such that at least the subsequent part of the protocol description which is irrelevant with respect to the measurement task is skipped, or, respectively, a stop command being included at a point of the protocol description in case it is certain that all protocol elements of the relevant protocol description have already been decoded. Compared with FIG. 1 one notices that in FIG. 3 in the protocol description the first four protocol elements have been combined, as they are not relevant for the measurement task assumed as an example. This compression of the protocol description is performed by a device 15a for the modification of the protocol description. To this end, an operator is shown a selection menu on a display 17, for example a computer screen, on which the operator can specify a measurement task by a corresponding selection and entry. With regard to the selection and entry by the operator, the device 15a for the modification of the protocol description modifies the general protocol description 12 to the compressed protocol description 12a. The decoder 10, which reads the compressed protocol description 12a, makes available to the processing device 20 decoded information 16a, as is seen more clearly below.

A compression of the protocol description can particularly occur through one or several of the following steps:
a) Combining of protocol elements of the protocol description, which are of no relevance with respect to the measurement task; and/or
b) Combining of dependencies and/or conditions; and/or
c) Incorporation of at least one skip command into the protocol description, the skip command being worded such that at least one subsequent part of the modified protocol description, which is irrelevant with respect to the measurement task, is skipped; and/or
d) Incorporation of a stop command in case all protocol elements of the relevant protocol description have been decoded.

The decoding demands used in connection with FIGS. 4, 5, 6, 8, 9, 10 have the following meanings:

| | |
|---|---|
| check element; | check the dependency towards the other protocol data |
| decode | decode the protocol data element; |
| skip | position the decoder in the data stream; |
| switch_on | position the decoder in the protocol description. |

Figures 5B, 6A, 6B, 7:
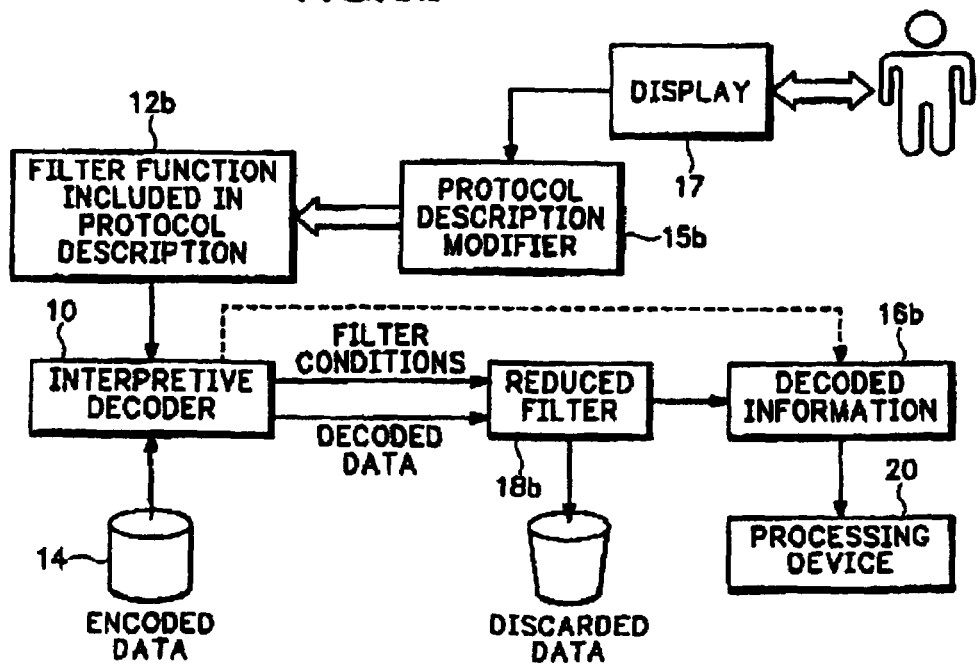

In FIG. 4 the determination of a cell identifier parameter "CID_LAC" is given as an example of a characteristic measurement task. On the protocol tester shown in FIG. 1 and known from prior art, a general protocol description is executed, which is shown in FIG. 5a. With a respective "decode" command, a respective protocol data element from the data stream is decoded (see also decoding results in FIG. 5b), while a "check" command represents a conditional data access that depends on the value or the existence of another protocol data element. As can be seen clearly, the parameter value is determined by CID_LAC in step 10. Although CID_LAC depends only directly on CID_DISC, the determination of the other parameters dependent on CID_DISC is necessary to determine the correct position of CID_LAC in the data stream. However, the associated decoding commands ("decode") are unnecessary because the real parameter value is of no interest, rather what is important is only whether or not it exists. The latter is determined by the corresponding "check" command. Therefore, in the present case, steps 3, 4, 6, 8, 11, 12, 13, 14 and 15 are performed, even though they are not relevant with respect to the measurement task.

FIG. 5b shows the associated decoding result, with the corresponding bit mask being shown on the very left, in the second column the name of the protocol data element, and in the right column the meaning of the protocol data element.

FIG. 6a shows the associated modified protocol description for solving the measurement task of FIG. 4, with which a protocol tester according to the present invention pursuant to FIG. 3 works. In step 1, CIS_DISC is decoded. In step 2 a switch-on command is executed in accordance with the decoded value of CIS_DISC, which positions the decoder in the protocol description. In step 3 a positioning of the decoder in the data stream is performed via a skip command. Finally, in step 4, the parameter CID_LAC, which is of interest, is decoded and made available as the only decoding result, see FIG. 6b.

This example clearly shows that it is possible with the invention to clearly reduce the interpretative calculation expense compared with the prior art.

Figure 2:
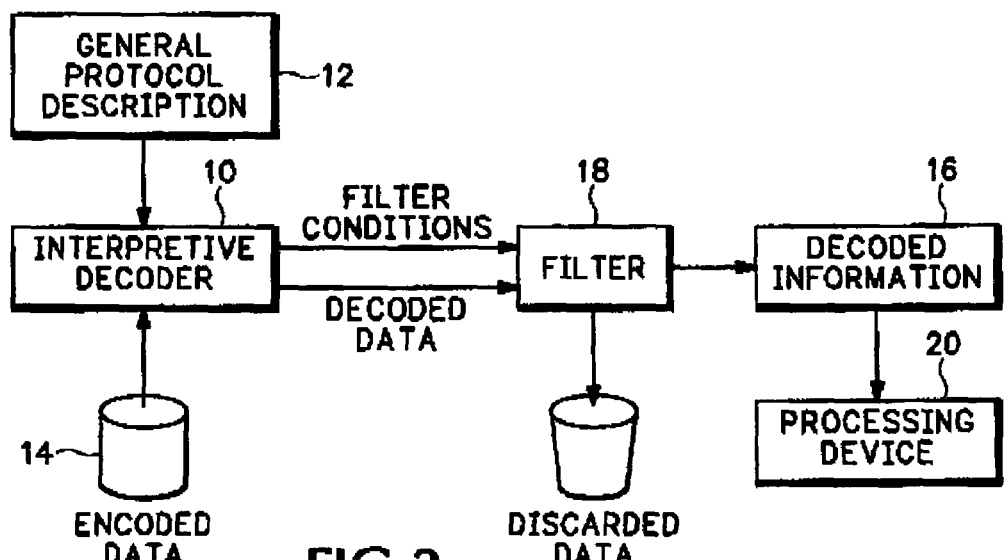
FIG. 2 is a schematic representation of elements of a second protocol tester known from prior art.

FIG. 7 shows another protocol tester which, compared to the protocol tester known from prior art and shown in FIG. 2, is developed further in that a part of the filter function originally envisaged in the filter device 18 is included in the protocol description 12b, which is read by the decoder 10. For the performance of the modification a device 15b is used for the modification of the protocol description which, in the general sense, works like the device 15a already mentioned in connection with FIG. 3 and also acts jointly with a display device 17. As a consequence there now is a reduced filter device 18b. The example described below with reference to FIGS. 8 to 10b is to show clearly the benefits of the invention over the prior art.

With this embodiment part of the filter conditions filed in the filter device 18 in the prior art is accordingly used for the modification of the protocol description 12. Thus, filtering already takes place on the one hand through the modified protocol description, and on the other hand through a modified filter device 18b with a reduced filter scope. When it is noted that the at least one filter condition is not fulfilled, that part of the modified protocol description is not executed, which is only relevant in case of the fulfillment of the at least one filter condition. This allows saving considerable computation time. At least a subset of the data can be transmitted to the filter device 18b for the examination of at least one further filter condition. Alternatively, or additionally, at least a subset of the data can be transmitted directly to the processing device 20 (shown by the dotted line in FIG. 7), bypassing the filter device 18b. The last-mentioned measure is to be preferred in particular when it is clear that the data, which fulfill the at least one filter condition, are not subjected to any further filtering in the filter device 18b. Moreover, it may be envisaged that a skip command is installed into the protocol description, which has to be executed if the at least one filter condition is not fulfilled, the skip command being worded such that at least the subsequent part of the modified protocol description, which is irrelevant with respect to the unfulfilled filter condition, is skipped. A modification of the protocol description can thus lead to a compression with respect to the time required for its execution and/or to the computation steps required for its execution.

FIG. 8 shows a filter condition, which consists in letting data pass through when the protocol data unit CIC_MCC is not equal to 222. FIG. 9a shows the associated decoding steps which are performed for the prior art protocol tester of FIG. 2, these being the same decoding steps as shown in FIG. 5a. In addition, FIG. 9b shows the associated decoding result, which corresponds to that of FIG. 5b. According to FIG. 9c, a filter step follows, in which it is examined whether CIC_MCC is not equal to 222. As can be seen from the sequence, the value of CIC_MCC is already determined in step 3 of FIG. 9a, with CIC_MCC in the present case being equal to 222, and hence, see filter condition of FIG. 8, the subsequent data being irrelevant with respect to the measurement task to be solved. At least steps 4 to 15 are therefore performed unnecessarily.

FIG. 10a shows a protocol description modified according to the present invention, for which the value of CIC_MCC is already determined in step 4. As the result in this example is that CIC_MCC equals 222, the subsequent data are to be allowed to pass through, the execution can be stopped at this point. FIG. 10b shows the result belonging to the modified protocol description of FIG. 10a. As is shown with this example, the calculation expense can be reduced quite substantially by the invention through the exclusion of data from further processing.

Of course, the embodiments shown in FIGS. 3 and 7 can be combined with one another.

The modification of the protocol description can occur automatically, particularly at the time of the configuration of the measurement task, for example by having an operator select a certain measurement task, i.e., by way of a selection menu shown on a screen, to have a corresponding modification of the general protocol description performed fully automatically by a device for the modification of the protocol description, located in the protocol tester. In this process, the device for the modification of the protocol description performs the following partial steps: first, the measurement task is analysed, after that the parts of the protocol description relevant with respect to the measurement task are fixed on the basis of the dependencies described in the protocol description, and finally, the protocol description is modified through the installation of one or several of the above-mentioned partial steps.

With respect to the modification of the filtering, according to the present invention, the automatic modification of the protocol description can, alternatively or additionally, include the following partial steps: first, analysis of the measurement task, then determination of at least one filter condition by which the protocol description is to be expanded, and finally, modification of the protocol description through the installation of the at least one filter condition determined earlier.

The modification of the protocol description can be preceded by a selection step for at least one measurement task, for example, by making a catalogue of measurement tasks available to an operator on a display medium, from which the operator may select. The selection step is especially preferably dialogue-controlled, particularly through the entry of specifications of the measurement task by an operator into entry fields envisaged therefor, for example, as an answer to a query and/or by way of selection from a selection menu made available.

It is particularly advantageous if the modified protocol description is stored in the protocol tester, particularly temporarily for the performance of the measurement task, while the original, general protocol description is stored permanently therein, in order to suitably modify it with respect to the performance of other measurement tasks. Of course, it is possible for other general protocol descriptions of different transfer protocols to be filed in the protocol tester, so that a large application area results for a protocol tester.

It may also be envisaged with regard to frequently recurring measurement tasks, that such tasks do not have to be specified again and again by an operator by dialogue control, but that, for example, with the assignment of a random name, the measurement task and/or the associated modified protocol description can be stored in the protocol tester, so that it can again be called up when required.

The preferred embodiments described in connection with the method according to the present invention apply, as is evident to the expert, of course also to the protocol tester according to the present invention, with process steps according to the present invention being realised through corresponding devices in the protocol tester, without again going into detail at this stage.

Thus the present invention provides a protocol tester that modifies a protocol description with respect to a specified measurement task and processes the modified protocol description, which modified protocol description may also include a filter condition.

What is claimed is:

1. An improved method of decoding data for the performance of a measurement task, the data having been encoded according to a protocol description, of the type including the steps of decoding the data according to the protocol description to produce decoded data for further processing, wherein the improvement comprises the steps of:

modifying the protocol description according to the measurement task to produce a modified protocol description; and decoding the data according to the modified protocol description so that the decoded data is only decoded data relevant to the measurement task wherein the modifying step comprises the step of compressing the protocol description to bypass data during the decoding step that is irrelevant for the measurement task.

2. The improved method according to claim 1 further comprising the step of filtering the decoded data prior to further processing according to a filter condition determined by the measurement task.

3. The improved method according to claim 1 wherein the modifying step comprises the step of installing a filter condition determined by the measurement task into the protocol description so that during the decoding step only data relevant to the measurement task is decoded.

4. The improved method according to claim 3 further comprising the step of filtering the decoded data prior to further processing according to a further filter condition determined by the measurement task.

5. An improved protocol tester for decoding data for the performance of a measurement task, the data having been encoded according to a protocol description, of the type including means for the decoding the data according to the protocol description to produce decoded data and means for processing the decoded data to produce measurement results, the improvement comprising means for modifying the protocol description to produce a modified protocol description as the protocol description for the decoding means so that only data relevant for the measurement task is decoded, wherein the modifying means comprises means for compressing the protocol description to produce the modified protocol description by bypassing data that is irrelevant for the measurement task.

6. The improved protocol tester according to claim 5 further comprising means for filtering the decoded data prior to the processing means according to a filter condition determined by the measurement task.

7. The improved protocol tester according to claim 5 wherein the modifying means comprises means for installing a filter condition determined by the measurement task into the protocol description to produce the modified protocol description so that in the decoding means only data relevant to the measurement task is decoded.

8. The improved protocol tester according to claim 7 further comprising means for filtering the decoded data prior to the processing means according to a further filter condition determined by the measurement task.

* * * * *